United States Patent [19]

Cave et al.

[11] Patent Number: 4,959,854
[45] Date of Patent: Sep. 25, 1990

[54] APPARATUS AND METHOD FOR AUTOMATICALLY RECONFIGURING TELEPHONE NETWORK RESOURCES

[75] Inventors: Ellis K. Cave, Garland; Dwain H. Hammond, Plano; Michael J. Polcyn, Allen, all of Tex.

[73] Assignee: InterVoice Inc., Dallas, Tex.

[21] Appl. No.: 471,284

[22] Filed: Jan. 26, 1990

[51] Int. Cl.⁵ .................. H04M 1/64; H04M 3/50
[52] U.S. Cl. ........................ 379/157; 379/165; 379/201
[58] Field of Search ............... 379/112, 157, 165, 201, 379/243; 370/62

[56] References Cited

U.S. PATENT DOCUMENTS

4,694,483 9/1987 Cheung .................. 379/112

Primary Examiner—Stafford D. Schreyer

[57] ABSTRACT

A system is provided to automatically reconfigure resource modules (302) to perform selected functions. Incoming telephone calls are allocated by a resource manager (304) to appropriate resource modules (302). Based upon logic programmed into a computer (309) coupled to the resource manager (304), the system can predict how many resource modules (302) providing each function are required to handle the incoming calls. The computer (309) directs the resource manager (304) to reconfigure certain of the resource modules (302) to provide the necessary functions. This reconfiguration can occur dynamically during any particular call.

52 Claims, 5 Drawing Sheets

APPARATUS AND METHOD FOR AUTOMATICALLY RECONFIGURING TELEPHONE NETWORK RESOURCES

TECHNICAL FIELD OF THE INVENTION

This invention relates to telephone networks, and more particularly to an apparatus and method for automatically reconfiguring telephone network resources.

BACKGROUND OF THE INVENTION

In telephone network systems, it is common that an incoming call may require one of several different types of resources. Such resources may include attendants in different departments of the called party's operations, attendants who speak different languages, or attendants who can provide different kinds of information to the caller. As communication becomes more sophisticated, however, the desired resources may include non-human resources such as voice response, voice recognition, DTMF recognition, DTMF generation and call progress recognition and various modems.

In order to accommodate such electronic resources, the electronic resources can be connected to the network and if the resources are shared, the main switching device can allocate each particular call to the proper resource, human or electronic, required by the caller. Typically, it is required to make predictions at system build time concerning the number of each type of resource required by the callers. The result may be, for example, five voice recognition circuits, four DTMF receivers, six voice compressors, three 212A modems and seven 303 modems coupled to the switch along with ten human attendants. A disadvantage of this system is that a call requiring voice recognition cannot completed if all of the voice recognition resources are busy, even if some of the other resources are available. Furthermore, although seven of one particular resource may be adequate the majority of the time, many more may be required at certain times. The owner of the telephone network is, therefore, forced to decide between having a tremendous backlog at certain times and having many of the resources sit idle most of the time.

One attempt to overcome the deficiencies of the prior art system of hardwiring fixed resources includes the use of standard resource boards which are differentiated by instructions fixed, for example, in read only memory (ROM). Thus, the operator of the telephone network informs the manufacturer of the equipment how many of which resources will be needed. The manufacturer then installs the appropriate ROM chip in each resource board and the boards are installed in the network. Each ROM contains instructions directing the digital signal processor on the board to function as a prescribed resource. With such a system, all of the resource boards are the same, enabling them to be manufactured (and sold) less expensively. Only the ROM chips are different for each type of resource. Nonetheless, the network operator must still predict how the various resources should be allocated. Changing the system to meet changing long term needs can be accomplished by having the manufacturer replace the ROM chip. Changing the ROM chips to meet demands of operations which change day-to-day and week-to-week, or even minute-to-minute, simply cannot be done. Thus, a ROM based system is nearly as rigid as one using hardwired, fixed resources.

Consequently, a need has arisen for a telephone system which provides resource modules that can be automatically reconfigured on a predictive or as-needed basis. A further need has arisen for circuitry which can communicate with each resource module and cause it to reconfigure responsive to incoming telephone calls.

SUMMARY OF THE INVENTION

In accordance with the present invention, an apparatus and method are provided for automatically managing and reconfiguring resource modules in a telephone network. More specifically, programmable resource modules are coupled to the telephone network under control of a resource manager. Each resource module is capable of performing any one of a number of different functions as instructed by the resource manager.

Each resource module comprises control circuitry for receiving and storing instructions from the resource manager and at least one programmable digital signal processor, responsive to the instructions, to actually perform the desired resource function. Such functions may include, for example, DTMF decoders; voice companders; call progress tone detectors; voice recognizers; 212A modems; 303 modems; MF decoders; FAX front-ends; and pulse-dial recognizers.

The resource manager includes circuitry for monitoring the telephone network and the status of each resource module. In one embodiment, the resource manager determines the resource needs of callers at any given time. The resource manager then directs the reconfiguration of one or more resource modules which are then providing a least-used function to provide the then needed function. In this way, a given number of resource modules can be used with maximum efficiency. None of the resource modules will be under-utilized (as would occur in prior art systems in which certain resources might be used only for peak loads) and functions can always be available so that all calls can be directed to the required resource.

Consequently, the present invention provides the technical advantage of allowing standard resource modules to be reconfigured to provide needed resource functions.

A further technical advantage is provided in that the telephone switch can be smaller (and therefore, less expensive) than the switch required in a prior art system having fixed resources.

A still further technical advantage is provided in that a smaller number of resources can be utilized since a single programmable resource can be dynamically modified during the course of a given call to handle a variety of functions.

In another embodiment, the resource manager, or a host computer, monitors the progress of a call and by anticipation, or otherwise, continues to reconfigure the programmable resource to handle the next needed function.

BRIEF DESCRIPTION OF THE DRAWINGS

For a more complete understanding of the present invention, and the advantages thereof, reference is now made to tho following descriptions taken in conjunction with the accompanying drawings, in which.

DETAILED DESCRIPTION OF THE INVENTION

The preferred embodiment of the present invention is best understood by referring to FIGS. 1-4 of the drawings, like numerals being used for like and corresponding parts of the various drawings.

Figure 1:
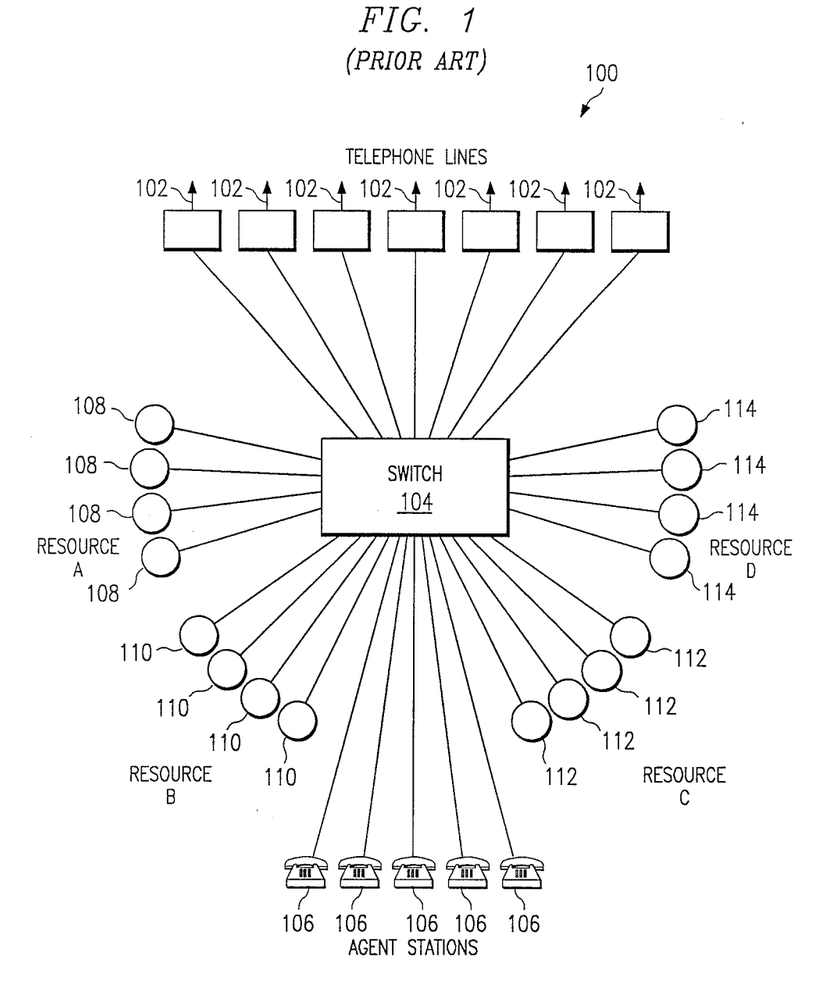
FIG. 1 illustrates a block diagram of a prior art system using fixed resources.

FIG. 1 illustrates a block diagram of a prior art telephone system, indicated generally as 100, using fixed resources. Numerous telephone lines 102 are coupled to a telephone switch 104 as are numerous agent stations 106. Fixed resource modules of type A 108, type B 110, type C 112, and type D 114 are also coupled to switch 104.

In operation, when a call comes in on a telephone line 102, switch 104 attempts to allocate the call to the required agent station 106 or resource 108, 110, 112 or 114. If, for example, the call requires a resource of type A, switch 104 will allocate the call to a fixed resource 108, if one is available. If all of the resources 108 of type A are in use, the call cannot be completed even if resources of other types 110, 112 and 114 are available.

The owner of system 100 has the option of adding additional resources of type A or allowing some calls to be incomplete. Adding additional resources is expensive, especially if the resource added is only used a small amount of time. On the other hand, allowing some of the calls to be incomplete usually results in dissatisfied customers or suppliers and may cause revenues to be lost.

Figure 2:
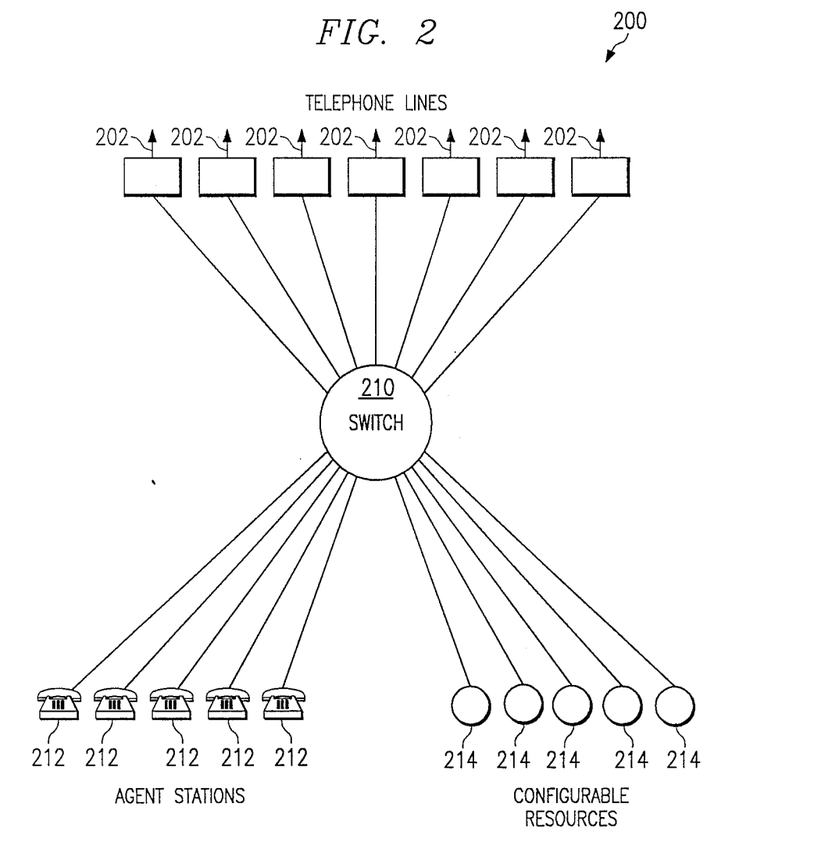
FIG. 2 illustrates a block diagram of one aspect of the present invention using configurable resource modules.

FIG. 2 is a block diagram of a telephone system, indicated generally as 200, of the present invention. Numerous telephone lines 202 are coupled to a switch 210 as are numerous agent stations 212. Several reconfigurable resource modules 214 are also coupled to switch 210. Each configurable resource module 214 is electronically identical to each other configurable resource module 214. Each does, however, have circuitry allowing it to be programmed to perform one of several resource functions.

In operation, a resource manager and a host computer (shown in FIG. 3) monitors telephone lines 202 and the status of each reconfigurable resource module 214. Calls are allocated by switch 210 between agent stations 212 and configurable resource modules 214 as needed. In the event that the resource manager determines that a particular resource is needed and unavailable, it will transmit control signals to the resource module presently configured to provide the least used function directing it to reconfigure to become the most needed function. Some resource modules may require some period of time to be reconfigured. In this situation, the resource manager may use predictive methods to preconfigure some of the resource modules based on anticipated requirements.

Figure 3:
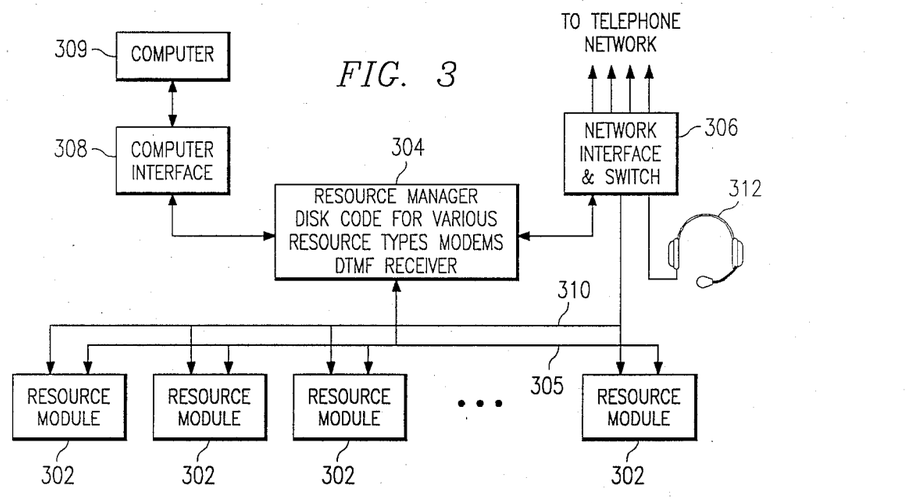
FIG. 3 illustrates a block diagram of the organization of the resource manager and resource modules.

FIG. 3 illustrates a block diagram of the present invention showing the relationship among resource manager 304, resource modules 302 and the telephone network. Resource modules 302 are coupled to the resource manager 304 via bus 305. Advantageously, this can be a parallel bus for high speed data transfer. The resource modules can be connected to network interface 306 over a serial bus 310. When the resource manager is located remotely from the resource module, the serial bus can be used instead of the parallel bus. Telephone network interface 306 can be a switch which permits control and status signals and audio signals to be transmitted between the telephone network and resource manager 304 or between the telephone network and attendants 312. In addition, computer interface 308 permits data and command signals to be transmitted between resource manager 304 and an external computer 309.

As will be discussed in more detail hereinafter, each resource manager 304 comprises a configurable digital signal processor, control circuitry and random access memory. Coupled to bus 305 of resource manager 304, each resource module 302 receives instructions from resource manager 304 based on calculations performed by resource manager 304 or by computer 309 interfaced to resource manager 304 through computer interface 308. These instructions are stored in RAM within resource manager 304 and are used to determine what configuration the digital signal processor will assume.

Figure 4:
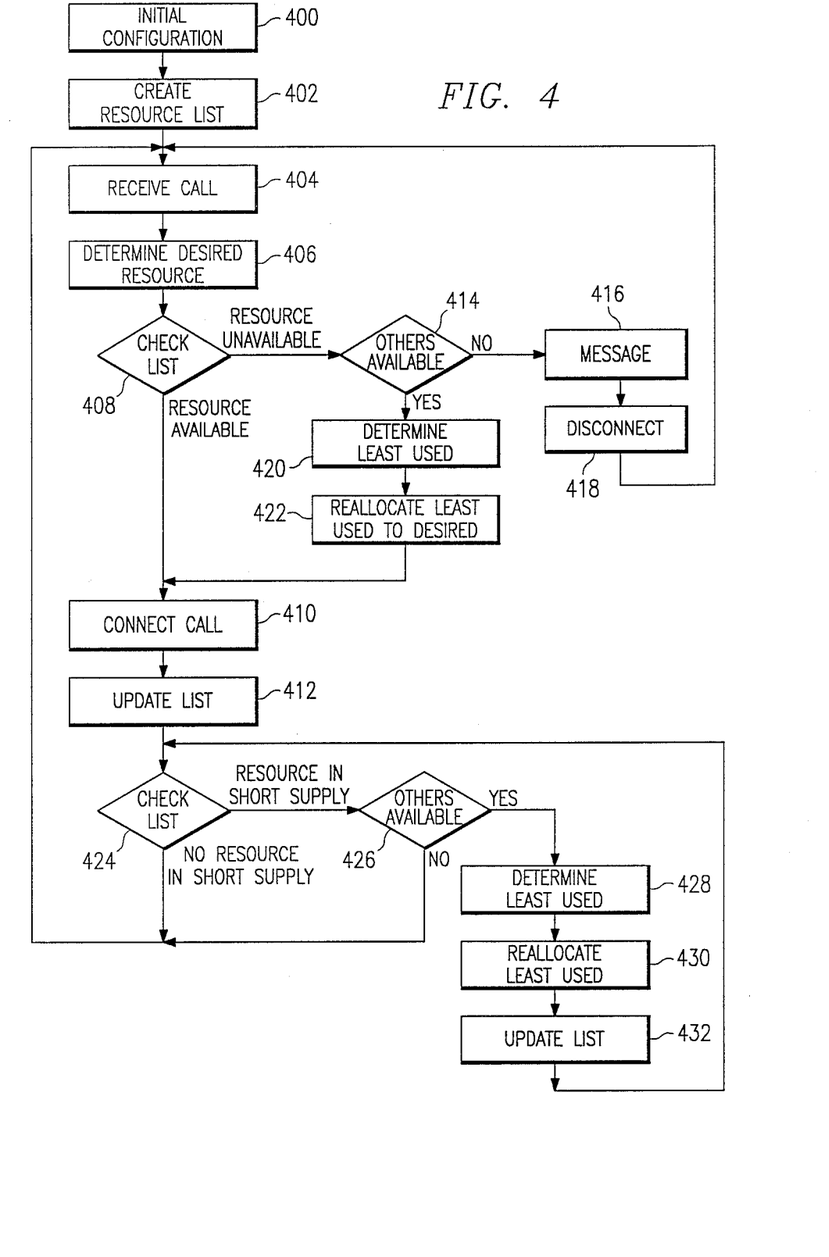
FIG. 4 illustrates a logic flow diagram of the computer to direct the reconfiguration of resource modules.

FIG. 4 illustrates a logic flow diagram of the steps utilized by the computer when operating in the shared usage mode to direct the reconfiguration of resource modules. When the system is first started, the computer directs an initial configuration 400 of the resource modules. A list is then created 402 which indicates how each resource module is configured. After a telephone call is received 404 by the system, the resource manager determines the resource required by the caller 406. The computer then checks the list 408; if the resource is available, the resource manager connects the call with the appropriate resource module 410 and the computer updates the list 412.

If the required resource is unavailable 408, the computer determines if others are available 414. If not, the resource manager sends a message 416 to the caller advising him/her that the call cannot be completed. The call is then disconnected 418. If other resources are available 414, then the computer determines which function is the least used 420. It then directs the resource manager to reconfigure an available, least-used resource module into the required function 422. The call is then connected 410 and the list updated 412.

Each time the resource manager updates the resource list 412, it checks the list to determine if any of the resources are in short supply based on predicted needs programmed into the resource manager. If not, the resource manager returns to wait for additional incoming calls 404. If a resource is in short supply 424, the resource manager determines if others are available 426. In the rare event that no resources are available, the resource manager returns to wait for additional incoming calls 404. When resources are available 426, the resource manager determines which function is the least used 428. The resource manager then reconfigures an available, least-used resource module into the required function 430 and updates the list 432. The resource manager checks the list again 424 to determine if there are any other resources in short supply. When the reallocation process has been completed, the resource manager returns to wait for additional incoming calls 404.

Figure 5:
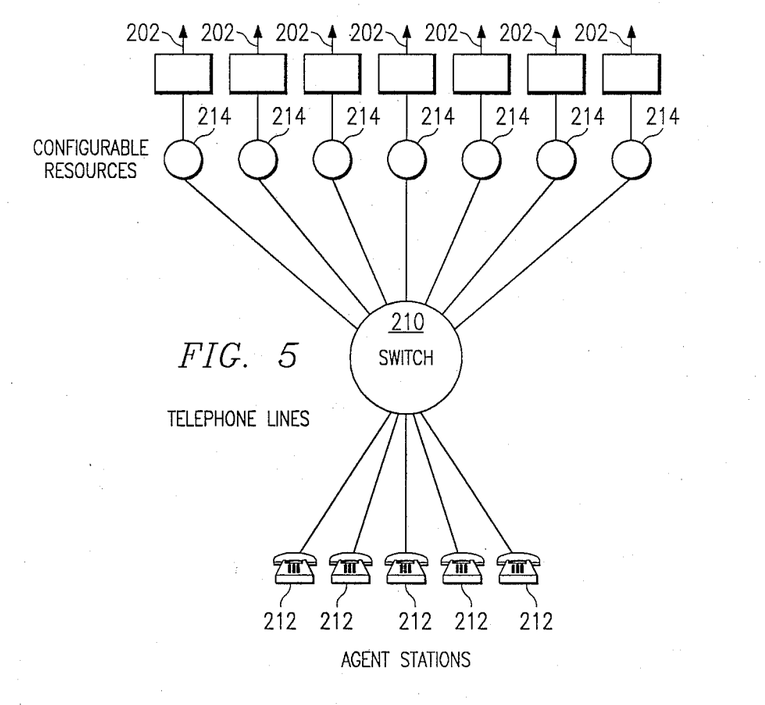
FIG. 5 illustrates a block diagram of a second aspect of the present invention in which a smaller switch can be used.

FIG. 5 illustrates a block diagram of the present invention in a different configuration. In this configuration, each telephone line 202 has a single configurable resource module 214 associated with it. Each resource module 214 is coupled between an outside line 202 and telephone switch 210. Agent stations 212 are also coupled to switch 210 in the usual manner. This configuration provides the advantage of requiring a smaller switch since fewer lines are used in the network.

While it may seem that using this arrangement only one resource can be used on any one call, such is not the situation. The resource can be reconfigured during a call. This can be understood best by an example, using FIG. 6. Assume an incoming call over line 1 (or line 2) from the telephone network, via codec 60, is determined to require voice answer capability. Resource manager 304, or under control of computer 309 (shown in FIG. 3) sends the proper instruction set to the digital signal processor within resource module 302 via interface 320 to configure the module to perform the function of voice compression and expanding. The resource manager then can transfer compressed voice data from its memory to a telephone line via the expansion capability of the newly configured resource module. Digital signal processor 302 can be, for example, TI-TMS 320C25.

Figure 6:
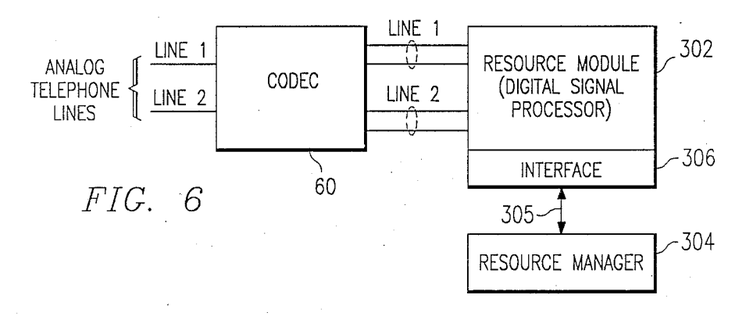
FIG. 6 shows details of the dedicated configuration of a programmable resource module working in conjunction with a resource manager.

When the voice message is finished, resource manager 304 then sends new coded instructions to resource module 302 so as to have that module reconfigure itself to function, for example, as a DTMF receiver, so as to be able to accept replies typed on the keypad by the caller. The resource module could, however, have been just as easily programmed, (if the situation warranted) to act as a voice decoder if the caller were to respond by voice. This determination could be made under control of signals passed back and forth from the calling station to the resource module or could have been made by using prestored call profiles, or in response to signals on the calling line identifying the call.

During the course of any calling connection, resource module 302, can be reconfigured any number of times as the situation warrants.

Figure 7:
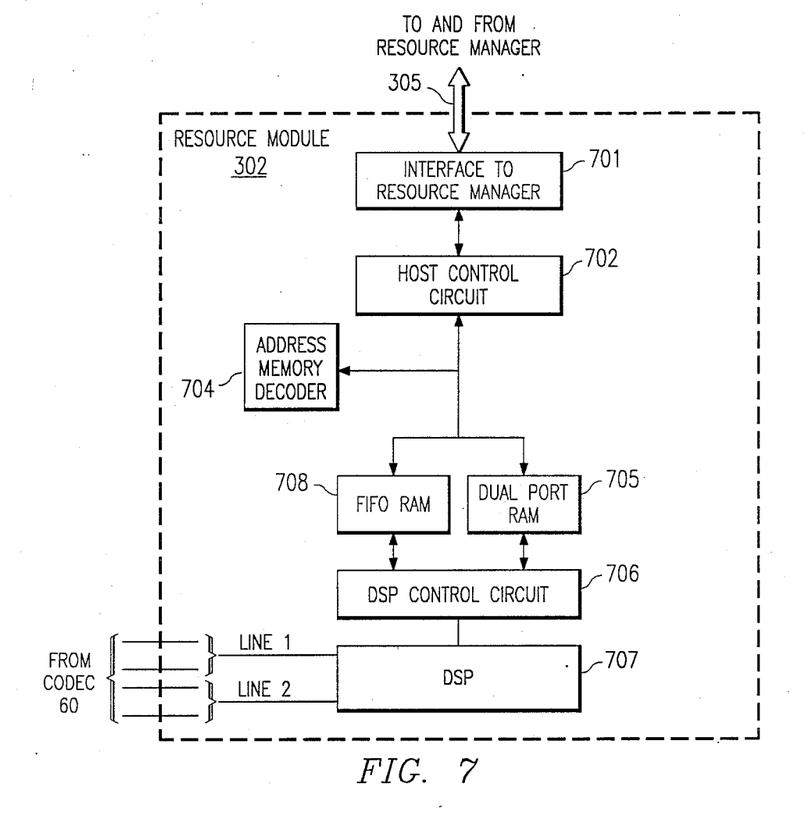
FIG. 7 shows details of the operational arrangement of the resource module.

Turning now to FIG. 7, there is shown resource module 302 which accepts digital information on lines 1 or 2 from codec 60. This digital information is representative of the analog information provided to the input of the codec, and the codec operates in a well known manner to perform the analog digital conversion and to control the gain of the signal back and forth from the calling line to the resource module. In the resource module there is a digital signal processor (DSP) 707 which operates to perform various functions with respect to the information received on line 1 or line 2. The digital signal processor control circuit 706 interfaces DSP 707 to the dual port RAM 705 and fifo RAM 708. The DSP executes code contained in the dual port RAM, which is programmed from information provided from the resource manager over bus 305 and via interface 306 to resource manager 701. The host control circuit 702 in conjunction with address memory decoder 704 provide input to one port of the dual port RAM 705. Thus, the resource manager over bus 305 can provide information for loading into dual port RAM 705, which information and signals serve to establish the function of the digital signal processor 707 as discussed. Once instructions have been loaded into dual port RAM 705, these instructions serve to control the function which digital signal processor 707 provides. However, once the processor is configured, other information must be loaded on a high speed dynamic basis, and this is loaded by fifo RAM 708 operating from information provided over bus 305. The type of information provided by fifo RAM 708, for example, can be the actual voice message which is communicated to a calling subscriber over lines 1 or 2. This voice message contains continually changing data which is provided by fifo RAM 708 as discussed previously while at the same time the same instruction set remains in dual port RAM 705 which controls the function of digital signal processor 707. Thus, for any given configuration, there are two types of data instructions. One set of instructions establishes the function, while the other set of instructions operate to provide the changing information which is either provided to a line or removed from a line depending upon the configuration circuit.

Although the present invention has been described in detail, it should be understood that various changes, substitutions and alterations can be made herein without departing from the spirit and scope of the invention as defined by the appended claims. For example, while the system has been shown for use with incoming calling connections, it can just as easily be used with outgoing connections. In such a situation, resource module 302 can be configured prior to a call to perform a certain function and then can be changed dynamically to perform a different function either on a shared basis or dedicated to a particular line.

What is claimed is:

1. A programmable resource circuit for use in conjunction with a telephone connection to or from telephone facilities, said resource circuit comprising:
   means for associating said resource circuit with a particular telephone connection;
   means for performing a plurality of different call functions with respect to said particular telephone connection; and
   means operable during said particular telephone connection for accepting instructions operable for controlling which of said functions is to be performed at a given time.

2. The resource circuit set forth in claim 1 further comprising:
   means for sharing said resource circuit with telephone connections established to or from a plurality of different telephone facilities; and
   wherein said associating means is operative on a telephone connection by connection basis with respect to each of said telephone lines.

3. The resource circuit set forth in claim 1 wherein said associating means permanently associates said resource with telephone connections established to or from a particular one of said facilities.

4. The resource circuit set forth in claim 1 further comprising:
   means for storing said instructions on a temporary basis.

5. The resource circuit set forth in claim 4 further comprising:
   means for receiving information for presentation to, or information received from, said associated telephone connection while said resource circuit is performing a particular function under control of said stored instructions; and means for temporarily storing said received information.

6. The resource circuit set forth in claim 5 further comprising:
means for processing said temporarily stored information under control of said stored instructions.

7. The resource circuit set forth in claim 6 wherein said processing means is a digital signal processor and wherein said temporarily stored information is digitized.

8. The resource circuit set forth in claim 1 wherein said instructions are received from a source external of said resource circuit.

9. The resource circuit set forth in claim 1 wherein said instructions are accepted from a plurality of different prestored instruction sets, each instruction set operable for controlling different telephone call functions.

10. The resource circuit set forth in claim 9 further comprising:
means for monitoring each said telephone connection; and
means controlled by said monitoring means for selecting which one of said instruction sets is operative at any given time.

11. A telephone system including a plurality of programmable resource circuits each for use in conjunction with a telephone connection to or from a telephone facility, said system comprising:
means for associating a selected one of said resource circuits with a particular telephone connection;
means for adapting each said resource circuit to perform one of a plurality of different call functions with respect to said particular telephone connection; and
means within said selected resource circuit for accepting instructions for controlling which of said functions is to be performed at a given time.

12. The system set forth in claim 11 wherein said controlling means is operable during said particular telephone connection to change said function on a dynamic basis.

13. The system set forth in claim 12 further comprising:
means for sharing said resource circuit with telephone connections established to or from a plurality of different telephone facilities; and
wherein said associating means is operative on a telephone connection by connection basis with respect to each of said telephone lines.

14. The system set forth in claim 11 wherein said associating means permanently associates said resource with telephone connections established to or from a particular one of said facilities.

15. The system set forth in claim 11 further comprising:
means for storing said instructions on a temporary basis.

16. The system set forth in claim 15 further comprising:
means for receiving information for presentation to, or information received from, said associated telephone connection while said resource circuit is performing a particular function under control of said stored instructions; and
means for temporarily storing said received information.

17. The system set forth in claim 16 further comprising:

means for processing said temporarily stored information under control of said stored instructions.

18. The system set forth in claim 17 wherein said processing means is a digital signal processor and wherein said temporarily stored information is digitized.

19. The system set forth in claim 11 wherein said instructions are received from a source external of said resource circuit.

20. The system set forth in claim 11 wherein said instructions are received from a source external of said system.

21. The system set forth in claim 11 wherein said instructions are accepted from a plurality of different prestored instruction sets, each instruction set operable for controlling different telephone call functions.

22. The system set forth in claim 11 further comprising:
means for monitoring each said telephone connection; and
means controlled by said monitoring means for selecting which one of said instruction sets is operative at any given time.

23. The method of operating a telephone system including a plurality of programmable resource circuits each for use in conjunction with a telephone connection to or from a telephone facility, said method comprising the steps of:
associating a selected one of said resource circuits with a particular telephone connection;
adapting each said resource circuit to perform one of a plurality of different call functions with respect to said particular telephone connection; and
accepting instructions within said selected resource circuit for controlling which of said functions is to be performed at a given time.

24. The method set forth in claim 23 wherein said operating step is enabled during said particular telephone connection to change said function on a dynamic basis.

25. The method set forth in claim 24 further comprising the step of:
sharing said resource circuit with telephone connections established to or from a plurality of different telephone facilities; and wherein said
associating step is operative on a telephone connection by connection basis with respect to each of said telephone lines.

26. The method set forth in claim 23 wherein said associating step permanently associates said resource with telephone connections established to or from a particular one of said facilities.

27. The method set forth in claim 23 further comprising:
means for storing said instructions on a temporary basis.

28. The method set forth in claim 27 further comprising the steps of:
receiving information for presentation to, or information received from, said associated telephone connection while said resource circuit is performing a particular function under control of said stored instructions; and
temporarily storing said received information.

29. The method set forth in claim 28 further comprising the step of:
processing said temporarily stored information under control of said store instructions.

30. The method set forth in claim 29 wherein said processing step is a digital signal processor and wherein said temporarily stored information is digitized.

31. The method set forth in claim 23 wherein said instructions are received from a source external of said resource circuit.

32. The method set forth in claim 23 wherein said instructions are received from a source external of said system.

33. The method set forth in claim 23 wherein said instructions are accepted from a plurality of different prestored instruction sets, each instruction set operable for controlling different telephone call functions.

34. The method set forth in claim 23 further comprising the steps of:
 monitoring each said telephone connection; and
 selecting, under control of said monitoring step, which one of said instruction sets is operative at any given time.

35. A system for reconfiguring resources in a telephone network, comprising:
 a resource manager; and
 a plurality of standard resource modules coupled to the telephone network, each of said resource modules configurable under control of said resource manager to perform a plurality of resource functions.

36. The system of claim 35 wherein said resource manager comprises:
 means for determining the resource required by received calls; and
 means responsive to said determining means for transmitting configuring instructions to said resource modules.

37. The system of claim 36 and further comprising means for monitoring said telephone network for determining said resource requirements and wherein said determining means is responsive to said monitoring means.

38. The system of claim 35 wherein each of said resource modules comprises:
 control circuitry responsive to said resource manager for receiving and storing instructions from said resource manager; and
 a programmable digital signal processor responsive to said processing circuitry, said digital signal processor operable to provide a resource function to said telephone network.

39. The system of claim 38 wherein said system further includes:
 a computer; and
 means for transferring instructions to and from said computer for establishing said configuring instructions.

40. The system of claim 35 wherein said resources are shared among a plurality of system call completion facilities.

41. The system of claim 35 wherein said resources are permanently associated with system call completion facilities.

42. A method for reconfiguring resource modules in conjunction with a telephone system where calls are completed to designated facilities, and wherein certain resources are necessary in order to process calls to said designated facilities, said method comprising the steps of:
 determining which resources are required by received calls; and
 reconfiguring in accordance with said determined required resources at least one of said modules such that it provides at any point in time the resource necessary for any particular said call.

43. The method of claim 42 wherein said reconfiguring step includes the step of monitoring the telephone system to determine said resource requirements.

44. The method of claim 42 wherein said reconfiguring step includes the step of downloading instructions for said required resource into memory on said resource module.

45. The method of claim 44 wherein said downloading step includes the step of sending and receiving instructions between a resource manager and a computer operating independent of said switching system.

46. The method of claim 42 wherein each said resource is permanently associated with a particular one of said facilities.

47. The method of claim 42 wherein each said resource is shared among a plurality of said facilities.

48. A method for reconfiguring shared resource modules in a telephone system where calls are completed to designated facilities, and wherein certain resources are necessary in order to process calls to said designated facilities, said method comprising the steps of:
 determining which resources are required by received calls; and
 dynamically reconfiguring, in accordance with said determined required resources, the least-used resource module such that it provides the most needed resource function with respect to any designated call completion facility.

49. The method of claim 48 wherein said reconfiguring step includes the step of monitoring the telephone system to determine said resource requirements.

50. The method of claim 48 wherein said reconfiguring step includes the step of downloading instructions for said required resource function into memory on said resource module.

51. The method of claim 50 wherein said downloading step includes the step of sending and receiving instructions between a resource manager and a computer operating independent of said switching system.

52. The method of claim 50 wherein said downloading is performed at system installation.

* * * * *